(12) United States Patent
Endo et al.

(10) Patent No.: US 8,040,783 B2
(45) Date of Patent: Oct. 18, 2011

(54) OPTICAL INFORMATION RECORDING AND REPRODUCING APPARATUS, AND CARTRIDGE

(75) Inventors: Takeshi Endo, Osaka (JP); Hiroshi Hatano, Takatsuki (JP); Tetsuya Noda, Tenri (JP); Kazutaka Noguchi, Hachioji (JP); Hiroyuki Matsuda, Yokohama (JP); Shigeru Yamasaki, Saitama (JP)

(73) Assignee: Konica Minolta Opto, Inc., Tokyo (JP)

( * ) Notice: Subject to any disclaimer, the term of this patent is extended or adjusted under 35 U.S.C. 154(b) by 128 days.

(21) Appl. No.: 12/606,705

(22) Filed: Oct. 27, 2009

(65) Prior Publication Data

US 2010/0110865 A1    May 6, 2010

(30) Foreign Application Priority Data

Oct. 31, 2008   (JP) ................... 2008-281112

(51) Int. Cl.
*G11B 7/00* (2006.01)
(52) U.S. Cl. .................. 369/112.29; 369/103
(58) Field of Classification Search ............. None
See application file for complete search history.

(56) References Cited

U.S. PATENT DOCUMENTS

| 5,822,092 A * | 10/1998 | Davis ..................... 359/10 |
| 2006/0279824 A1 * | 12/2006 | Riley et al. .............. 359/35 |
| 2008/0165654 A1 * | 7/2008 | Fukuhara ................ 369/103 |

FOREIGN PATENT DOCUMENTS

JP    2008-123627    5/2008

* cited by examiner

*Primary Examiner* — Christopher Lamb
(74) *Attorney, Agent, or Firm* — Cozen O'Connor (57) ABSTRACT

An optical information recording and reproducing apparatus relating to the invention employs a two-beam interference method. In the optical information recording and reproducing apparatus, a moving device moves an information recording medium between a recording and reproducing position and a retracting position, and a mirror moves together with the information recording medium. When the information recording medium moves to the recording and reproducing position, the mirror moves to a position which is displaced from the at least one of the reference beam and the information beam. When the information recording medium moves to the retracting position, the mirror moves to a position where the mirror can reflect the at least one of the reference beam and the information beam toward a detector for detecting a deviation of the at least one of the reference beam and the information beam.

6 Claims, 11 Drawing Sheets

OPTICAL INFORMATION RECORDING AND REPRODUCING APPARATUS, AND CARTRIDGE

This application is based on Japanese Patent Application No. 2008-281112 filed on Oct. 31, 2008, in Japanese Patent Office, the entire content of which is hereby incorporated by reference.

TECHNICAL FIELD

The present invention relates to an optical information recording and reproducing apparatus and to a cartridge for use in the optical information recording and reproducing apparatus. The present invention particularly relates to an optical information recording and reproducing apparatus and a cartridge, provided for recording information on a recording medium wherein information is to be recorded, and for reproducing information from the recording medium wherein information has been recorded, by using holography.

BACKGROUND

In recent years, there has been proposed a high-density optical information recording and reproducing apparatus based on the principle of holography as disclosed in JP-A No. 2008-123627. In such the optical information recording and reproducing apparatus, in the information recording mode, a light emitted from one light source is split into an information beam containing information to be modulated by a spatial light modulator (SLM), and a reference beam. The two beams having been split are incident on a recording medium from different directions, and the information can be recorded in the form of an interference fringe. On the other hand, in the information reproduction mode, the same reference beam as that in the information recording mode is radiated onto the recording medium having information recorded thereon, and the interference fringe is read, whereby the information having been recorded is reproduced.

The optical information recording and reproducing apparatus based on the principle of holography described above records information using an interference fringe made up of an information beam and a reference beam. Thus, the relationship between the information beam and reference beam at the time of recording and reproduction is crucial. To put it more specifically, for example, if the reference beam has a state different from that used at the time of recording information and it is incident on the recording medium for reproducing information, the information may not be recorded correctly. The different state of the reference beam in the sense in which it is used here includes a difference in a wavelength of a light source, a difference in an angle of a beam incident on a recording medium, and variations of amplitude or phase distribution in the reference beam.

Incidentally, it can be said that the wavelength of a light source and the amplitude and phase distribution in the reference beam depend on the characteristics of each individual semiconductor laser and are stable to a certain extent. By contrast, the angle of the beam incident on a recording medium tends to be changed from a default setting value by being affected by a vibration and environmental temperature variation at the time of transporting or using an optical information recording and reproducing apparatus, and chronological changes, for example. In the meantime, when the output intensity of the semiconductor laser is to be employed maximally for the intensity of information beam, a step is taken in some cases to ensure the light-flux diameter of the information beam will be approximately the same as that size of the SLM, or will be slightly greater than that size of the SLM for the purpose of a margin of safety. In this case, however, if the optical axis of the optical path of the information beam has made a parallel displacement in excess of the margin of safety with respect to the position at the time of manufacturing for some reasons, a part of the information beam will not enter the SLM, with the result that the beam is not effectively used.

SUMMARY

In view of the prior art problems described above, the present invention provides an optical information recording and reproducing apparatus and a cartridge for use in the optical information recording and reproducing apparatus. The optical information recording and reproducing apparatus has a satisfactory recording and reproduction capabilities such that, even if the optical path of the information beam or reference beam in an optical information recording and reproducing apparatus has been deviated from the default setting position at the time of manufacturing, the deviation is detected and is appropriately corrected.

The optical information recording and reproducing apparatus employs a two-beam interference method that information is recorded for an information recording medium by using an interference between a reference beam and an information beam both incident on the information recording medium from different directions, and information is reproduced by making the reference beam incident on the information recording medium and guiding the light flux from the information recording medium to the image receiving element. The optical information recording and reproducing apparatus includes a moving device for moving the information recording medium between a recording and reproducing position and a retracting position; a mirror for moving together with the information recording medium; and a detector for detecting a deviation of at least one of the reference beam and the information beam. The mirror moves to a position which is displaced from the at least one of the reference beam and the information beam when the information recording medium moves to the recording and reproducing position, and moves to a position where the mirror can reflect the at least one of the reference beam and the information beam toward the detector when the information recording medium moves to the retracting position.

These and other objects, features and advantages according to the present invention will become more apparent upon reading of the following detailed description along with the accompanied drawings.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

DESCRIPTION OF THE PREFERRED EMBODIMENT

The following describes the preferred embodiments of the present invention.

One embodiment of the present invention is an optical information recording and reproducing apparatus comprising: a light source; a splitting element for splitting a light flux from the light source into light fluxes; an optical system for guiding one of the light fluxes split by the splitting element to an information recording medium as a reference beam; a spatial light modulation element for receiving the other of light fluxes split by the splitting element and generating an information beam; an objective lens for converging the information beam onto the information recording medium; and an image receiving element for receiving a light flux from the information recording medium. The optical information recording and reproducing apparatus further comprises a moving device for moving the information recording medium between a recording and reproducing position where information can be recorded or reproduced for the information recording medium and a retracting position where the information recording medium is retracted away from the recording and reproducing position; a mirror for moving together with the information recording medium; and a detector for detecting a deviation of at least one of the reference beam and the information beam. The optical information recording and reproducing apparatus employs a two-beam interference method that information is recorded for the information recording medium by using an interference between the reference beam and the information beam both radiated from different directions, and that information is reproduced by radiating the reference beam onto the information recording medium and guiding the light flux from the information recording medium to the image receiving element. The mirror moves to a position which is displaced from the at least one of the reference beam and the information beam when the information recording medium moves to the recording and reproducing position, and moves to a position where the mirror can reflect the at least one of the reference beam and the information beam toward the detector when the information recording medium moves to the retracting position.

According to this arrangement, for example, when the optical information recording and reproducing apparatus is transported, a deviation may occur in the information beam and/or reference beam entering the recording medium with respect to the default setting due to a vibration and environmental temperature variation at the time of transporting or operation of the optical information recording and reproducing apparatus, and chronological changes. If this should have occurred, the deviation can be detected by the detector, according to the arrangement. In this case, the recording medium is movable between the recording and reproduction position wherein information can be recorded or reproduced, and the retracted position wherein the recording medium is retracted from the recording and reproduction position. The mirror places at the position displaced from the information beam or reference beam when the recording medium has moved to the recording and reproduction position. When the recording medium has moved to the retracted position, the mirror places at a position where the mirror can reflect the reference beam or information beam. Thus, moving the recording medium to the retracted position ensures that at least one of the information beam and reference beams can be reflected by the mirror. Further, a light flux for deviation detection can be led to the detector by using the existing optical system for recording and reproduction. This ensures easy detection, structure simplification and cost reduction. It should be noted that the "recording and reproduction position" indicates the position which makes the reference beam and the information beam incident on a recording layer of the recording medium. It should be noted that the "deviation of at least one of the reference beam and the information beam" indicates that at least one of the reference beam and the information beam is deflected from a reference optical path, where the reference optical path is an optical path in the state that information is recorded on the information recording medium by using an interference between the reference beam and the information beam radiated from different directions, or an optical path in the state that information is reproduced from the information recording medium by radiating the information beam onto the information recording medium. For example, the reference optical path can be defined with a pin hole arranged on an optical path of the optical information recording and reproducing apparatus and with a mirror moved with the information recording medium which moves to the retracting position. By detecting light passing through the pin hole, the deviation of at least one of the reference beam and the information beam can be detected.

In the above embodiment, the mirror preferably moves to a position such that the information beam and the reference beam intersect to each other at a reflection point on the mirror, when the information recording medium moves to the retracting position. It enables to secure the long reference optical path and to perform the detection with high accuracy.

In the above embodiment, the moving device may be a stage for placing the information recording medium thereon and moving the information recording medium, and the mirror may be mounted on the stage. According to the structure, a stage prepared for the tracking operation can also move the mirror. Thereby, it allows optical information recording and reproducing apparatus to reduce the number of components and to reduce the cost.

In the above embodiment, the optical information recording and reproducing apparatus may further comprise a cartridge for being moved by the moving device and for housing the information recording medium therein, and the mirror is mounted on the cartridge. Thereby, the mirror can be moved together with the information recording medium. It allows optical information recording and reproducing apparatus to reduce the number of components and to reduce the cost.

In the above embodiment, it is preferable that the optical information recording and reproducing apparatus further comprises a lens for converging a light flux onto a light-receiving surface of the detector, where the light flux travels along an optical path of the at least one of the reference beam and the information beam after being reflected by the mirror. Thereby, the deviation can be detected with higher accuracy, even when an inexpensive and small detector is employed.

In the above embodiment, it is preferable that the optical information recording and reproducing apparatus further comprises a correction mechanism for correcting the deviation of the at least one of the information beam and the reference beam based on an output of the detector, and that the correction mechanism comprises two mirrors arranged at an optical path between the light source and the information recording medium, and a drive mechanism for changing an angle between the two mirrors.

According to the structure, the correction mechanism can properly correct at least one of the information beam and the reference beam entering the recording medium based on the deviation detected by the detector so as to adjust the beam entering the recording medium to the predetermined position. It can provide an optical information recording and reproducing apparatus with an excellent recording and reproducing property.

Another embodiment of the present invention is a cartridge for use in an optical information recording and reproducing apparatus employing a two-beam interference method that information is recorded for the information recording medium by using an interference between the reference beam and the information beam both radiated from different directions, and information is reproduced by radiating the reference beam onto the information recording medium and guiding the light flux from the information recording medium to the image receiving element. The cartridge comprises: a casing for housing an information recording medium therein; and a mirror mounted on the casing. It enables to move the mirror together with the information recording medium and, the mirror is not required to be provided in the optical information recording and reproducing apparatus. It allows the optical information recording and reproducing apparatus carrying the cartridge to reduce the number of components and to reduce the cost.

Another embodiment of the present invention is an optical information recording and reproducing apparatus adopted to record and reproduce information for an information recording medium housed in the above cartridge. The optical information recording and reproducing apparatus comprises: a light source; a splitting element for splitting a light flux from the light source into light fluxes; an optical system for guiding one of the light fluxes split by the splitting element to an information recording medium as a reference beam; a spatial light modulation element for receiving the other of light fluxes split by the splitting element and generating an information beam; an objective lens for converging the information beam onto the information recording medium; an image receiving element for receiving a light flux from the information recording medium; a moving device for moving the information recording medium between a recording and reproducing position where information can be recorded or reproduced for the information recording medium and a retracting position where the information recording medium is retracted away from the recording and reproducing position; and a detector for detecting a deviation of at least one of the reference beam and the information beam. The optical information recording and reproducing apparatus employs a two-beam interference method that information is recorded for the information recording medium by using an interference between the reference beam and the information beam both radiated from different directions, and that information is reproduced by radiating the reference beam onto the information recording medium and guiding the light flux from the information recording medium to the image receiving element. The moving device moves the mirror which is mounted on the casing of the cartridge, together with the information recording medium. The mirror moves to a position which is displaced from the at least one of the reference beam and the information beam when the information recording medium moves to the recording and reproducing position, and moves to a position where the mirror can reflect the at least one of the reference beam and the information beam toward the detector when the information recording medium moves to the retracting position.

According to this arrangement, for example, when the optical information recording and reproducing apparatus is transported, a deviation may occur in the information beam and/or reference beam entering the recording medium with respect to the default setting due to a vibration and environmental temperature variation at the time of transporting or operation of the optical information recording and reproducing apparatus, and chronological changes. If this should have occurred, the deviation can be detected by the detector, according to the arrangement. In this case, the recording medium is movable between the recording and reproduction position wherein information can be recorded or reproduced, and the retracted position wherein the recording medium is retracted from the recording and reproduction position. The mirror places at the position displaced from the information beam or reference beam when the recording medium has moved to the recording and reproduction position. When the recording medium has moved to the retracted position, the mirror places at a position where the mirror can reflect the reference beam or information beam. Thus, moving the recording medium to the retracted position ensures that at least one of the information beam and reference beams can be reflected by the mirror. Further, a light flux for deviation detection can be led to the detector by using the existing optical system for recording and reproduction. This ensures easy detection, structure simplification and cost reduction. In the arrangement, the mirror is not required to be provided in the optical information recording and reproducing apparatus. It allows the optical information recording and reproducing apparatus carrying the cartridge to reduce the number of components and to reduce the cost.

In the above embodiment, the moving device preferably moves the mirror to a position such that the information beam and the reference beam intersect to each other at a reflection point on the mirror, when the information recording medium moves to the retracting position. It enables to secure the long reference optical path and to perform detection with high accuracy.

In the above embodiment, it is preferable that the optical information recording and reproducing apparatus, further comprises: a lens for converging a light flux onto a light-receiving surface of the detector, where the light flux travels along an optical path of the at least one of the reference beam and the information beam after being reflected by the mirror. Thereby, the deviation can be detected with higher accuracy, even when an inexpensive and small detector is employed.

In the above embodiment, it is preferable that the optical information recording and reproducing apparatus further comprises a correction mechanism for correcting the deviation of the at least one of the information beam and the reference beam based on an output of the detector, and that the correction mechanism comprises two mirrors arranged at an optical path between the light source and the information recording medium, and a drive mechanism for changing an angle between the two mirrors.

According to this arrangement, the correction mechanism can properly correct at least of the information beam and the reference beam entering the recording medium based on the deviation detected by the detector so as to adjust the beam entering the recording medium to the predetermined position. It can provide an optical information recording and reproducing apparatus with an excellent recording and reproducing property.

Accordingly, the present invention provides an optical information recording and reproducing apparatus and a cartridge for use in the optical information recording and reproducing apparatus, where the optical information recording and reproducing apparatus has a satisfactory recording and reproduction capabilities such that, even if the optical path of the information beam or reference beam in an optical information recording and reproducing apparatus has been deviated from the default setting position at the time of manufacturing, the deviation can be detected and be appropriately corrected.

Figure 1:
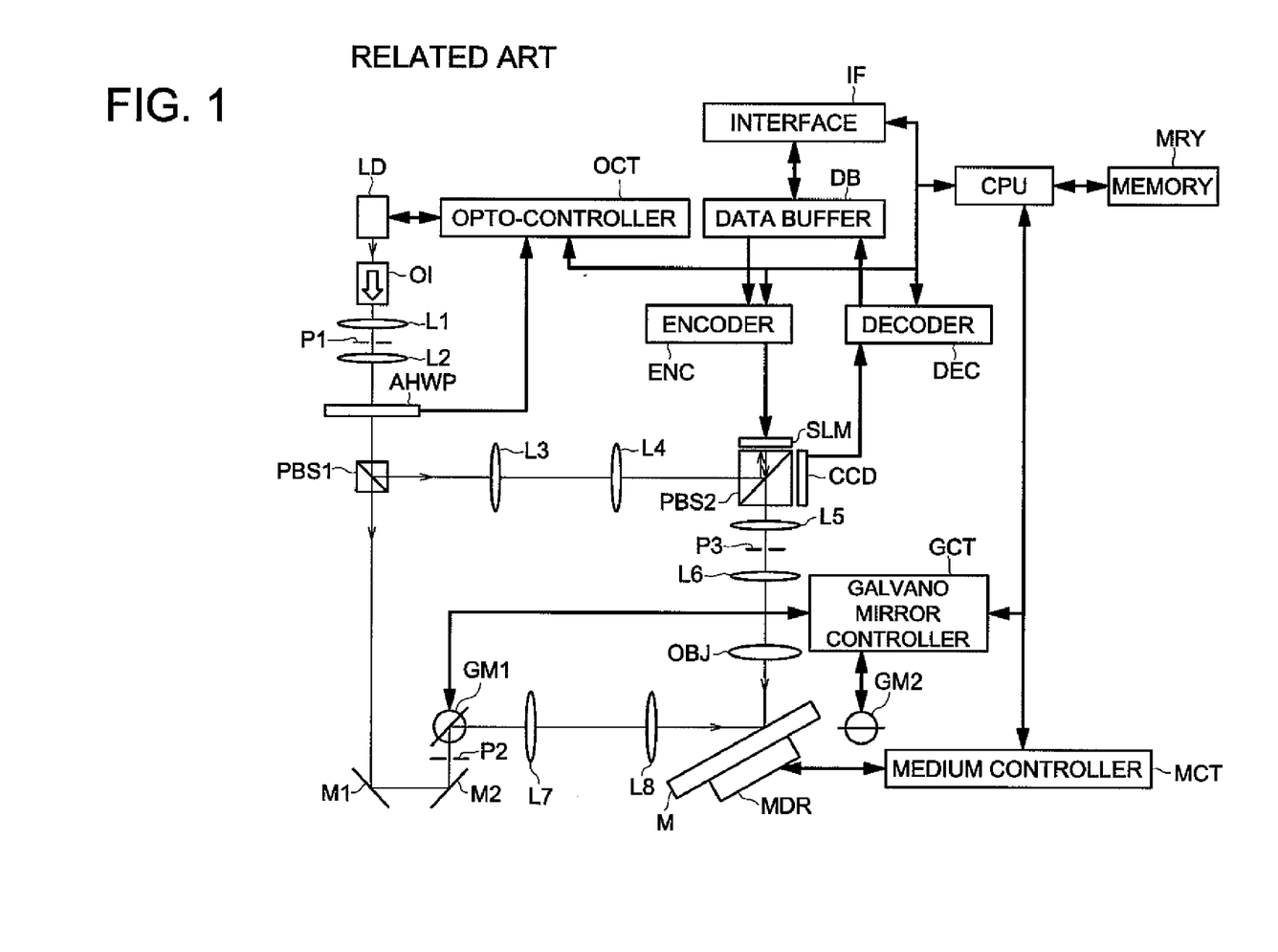
FIG. 1 is a block diagram representing an optical information recording and reproducing apparatus of two-beam interference method shown as a comparative example.
Figure 2:
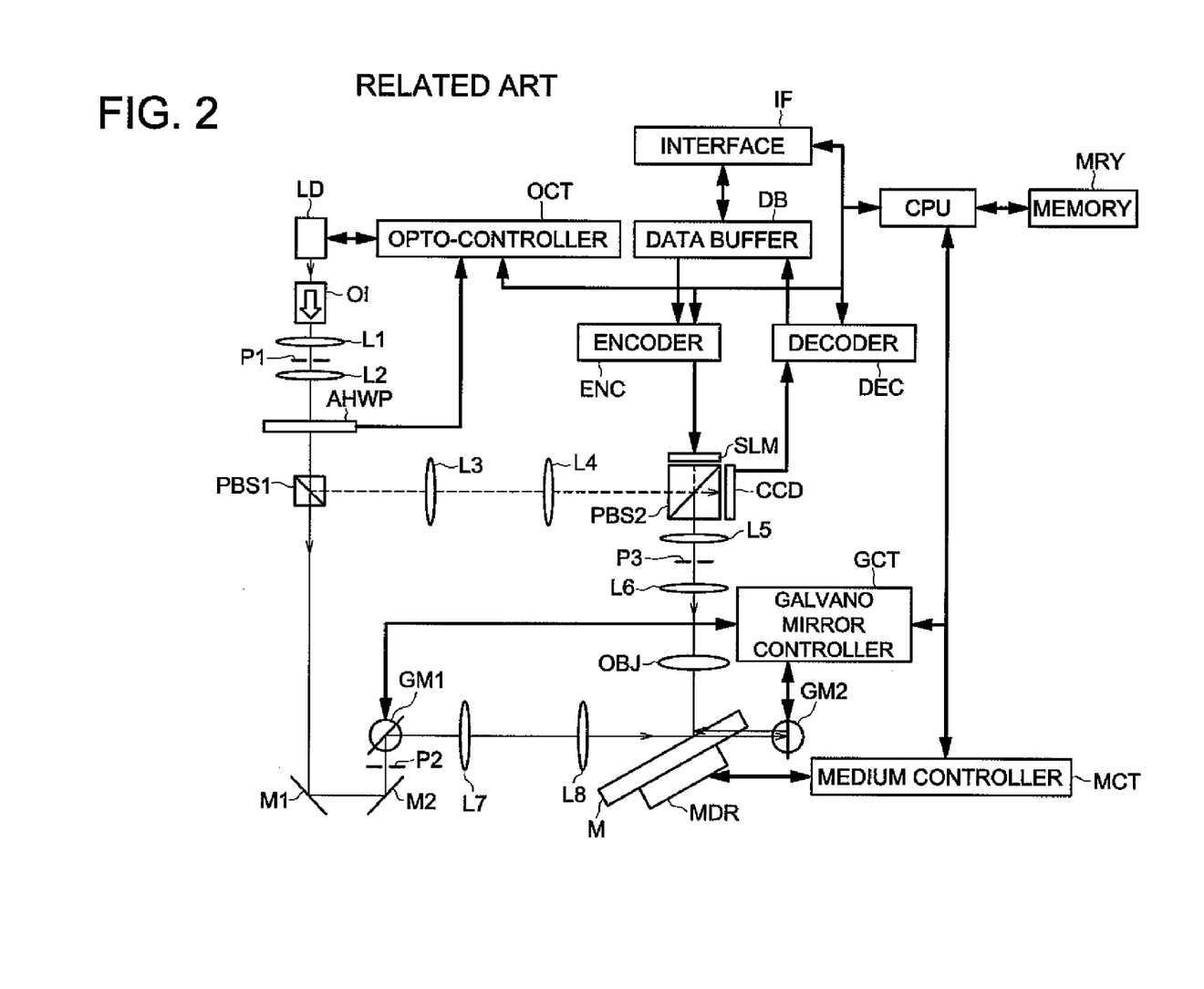
FIG. 2 is another block diagram representing an optical information recording and reproducing apparatus of two-beam interference method shown as a comparative example.

The following describes the embodiments of the present invention with reference to drawings. To illustrate a comparative example, the structure and recording/reproduction operation of the optical information recording and reproducing apparatus not provided with elements such as a moving device, a mirror, a detector, and a correction mechanism will be described in the first place. The optical information recording and reproducing apparatus formed by adding the elements such as a moving device, a mirror, a detector, and a correction mechanism to the comparative example will then be described. FIGS. 1 and 2 are block diagrams representing an optical information recording and reproducing apparatus of two-beam interference method shown as a comparative example. FIG. 1 shows the optical information recording and reproducing apparatus in the recording mode. FIG. 2 shows the optical information recording and reproducing apparatus in the reproduction mode. In the block diagrams, a solid line indicates a wiring between devices, and a thin line indicates an optical path of an outgoing light flux. A dotted line denotes that a light flux is interrupted.

The optical information recording and reproducing apparatus given in FIGS. 1 and 2 includes a semiconductor laser LD as a light source, and first polarized beam splitter PBS1 as a splitting element for splitting the light flux into two light fluxes by transmitting and reflecting the light flux from this semiconductor laser LD. There are arranged optical isolator OI that transmits the light flux from the semiconductor laser LD and blocks the passage of the light flux in the opposite direction, first lens L1, first pin hole P1 working as a spatial filter for regulating a wave surface, second lens L2, and active half wave plate AHWP in a common optical path between the semiconductor laser LD and the first polarized beam splitter PBS1. The semiconductor laser LD and active half wave plate AHWP are driven and controlled by opto-controller OCT. The active half wave plate AHWP can be rotated, for example, under the control of opto-controller OCT. The polarizing direction of the light flux entering the first polarized beam splitter PBS1 is changed between the time of recording and the time of reproduction. In the recording mode, a light flux passing through the first polarized beam splitter PBS1 and a reflected light flux are generated. In the reproduction mode, only the light flux passing through the first polarized beam splitter PBS1 is generated, without the reflected light flux to be produced. The optical isolator OI is provided for preventing returning light from entering the semiconductor laser LD at the time of recording and reproduction, and for ensuring a stable oscillation of the semiconductor laser LD.

In the optical path dedicated for information beam between the first polarized beam splitter PBS1 and hologram recording medium M, there is arranged third lens L3, fourth lens L4, second polarized beam splitter PBS2, fifth lens L5, third pin hole P3 serving as a spatial filter for regulating a wave surface, sixth lens L6 and objective lens OBJ. In the meantime, in the optical path dedicated for reference beam between the first polarized beam splitter PBS1 and hologram recording medium M, there is arranged first mirror M1, second mirror M2, second pin hole P2 serving as a spatial filter for regulating a wave surface, first galvano mirror GM1, seventh lens L7 and eighth lens L8. These components constitute an optical system for guiding the reference beam. Further, on the extension of the optical path dedicated for the reference beam, second galvano mirror GM2 is arranged on the side opposite to the eighth lens L8, with the recording medium M sandwiched in between. The first galvano mirror GM1 and the second galvano mirror GM2 are driven by galvano mirror controller GCT. The information beam and reference beam are radiated so as to cross each other on the recording medium M. The recording medium M is driven by the medium drive mechanism MD under the control of medium controller MCT.

The CPU controls the opto-controller OCT, galvano mirror controller GCT and medium controller MCT. In the recording mode, the CPU further allows the data of the data buffer DB to be converted by the encoder ENC via the interface IF and permits the data to be put into the spatial light modulator SLM as the spatial light modulating element adjacent to one surface of the second polarized beam splitter PBS2. In the reproduction mode, the CPU allows the decoder DEC to convert the data inputted via the two-dimensional image sensor CCD (wherein the Charge Coupled Device or Complementary Metal-Oxide Semiconductor can be used) as the image light receiving element adjacent to the other surface of the second polarized beam splitter PBS2. After having been inputted into the data buffer DB, the data is read out and is stored in the external memory MRY.

Referring to FIG. 1, the following describes the operation of the optical information recording and reproducing apparatus in the recording mode. A light flux emitted from the semiconductor laser LD passes through the optical isolator OI, and is converged by the first lens L1. This light flux passes through the first pin hole P1, then through the second lens L2, whereby a parallel light flux is formed, and enters an active half wave plate AHWP. Since the active half wave plate AHWP has been rotated to the recording position, the light flux in a predetermined polarized state after passing therethrough enters the first polarized beam splitter PBS1 as a splitting element. Then the light flux is split into a passing light flux (reference beam) and reflected light flux (information beam).

The light flux reflected by the first polarized beam splitter PBS1 passes through the third lens L3 and fourth lens L4. Being reflected by the second polarized beam splitter PBS2, this light flux enters the spatial light modulator SLM. The light flux having entered is subjected to the two-dimensional modulation corresponding to predetermined information and is reflected by the function of the spatial light modulator SLM. Thus, the light flux passes through the second polarized beam splitter PBS2 to change its direction of polarization, then through the fifth lens L5, third pin hole P3 and sixth lens L6, and is converged to the recording layer of a recording medium M through the objective lens OBJ.

In the meantime, the light flux having passed through the first polarized beam splitter PBS1 is reflected by the first mirror M1 and second mirror M2. After passing through the second pin hole P2, the light flux is reflected by the first galvano mirror GM1. After passing through the seventh lens L7 and eighth lens L8, the light flux is incident on the recording layer of the recording medium M from the direction different from the information beam, at a predetermined relative incident angle. The information beam and reference beam at this time are incident on the same position, whereby an interference fringe is generated and information can be recorded. The relative angle of the information beam and reference beam is changed by adjusting the angle of the first galvano mirror GM1 by the galvano mirror controller GCT. This arrangement permits multiplex information recording to be performed on the recording medium.

Referring to FIG. 2, the following describes the operation of optical information recording and reproducing apparatus in the reproduction mode. The light flux emitted from the semiconductor laser LD passes through the optical isolator OI and is converged by the first lens L1. This light flux passes through the first pin hole P1 and second lens L2, whereby parallel light is formed and enters the active half wave plate AHWP. The active half wave plate AHWP has been rotated to the reproduction position. Thus, the light flux in a predetermined polarization state after having passed therethrough enters the first polarized beam splitter PBS1 as a splitting element. Then only the passing light flux (reference beam) remains.

The light flux having passed through the first polarized beam splitter PBS1 is reflected by the first mirror M1 and second mirror M2. After passing through the second pin hole P2, the light flux is reflected by the first galvano mirror GM1. Passing through the seventh lens L7 and eighth lens L8, the light flux is radiated to the recording medium of the recording medium M, and passes through the position wherein information is recorded.

The light flux having passed through the recording medium M is reflected by the second galvano mirror GM2, and re-enters the recording medium M. The re-entry angle of the reflected light is controlled by the first galvano mirror GM1 and second galvano mirror GM2.

The light flux having re-entered the recording medium M is formed into the light flux having a pattern conforming to the interference fringe recorded on the recording layer of the recording medium M. This patterned light further passes through the objective lens OBJ, sixth lens L6, third pin hole P3 and fifth lens L5. Being reflected by the polarized beam splitter PBS2, the light enters the light receiving surface of the two-dimensional image sensor CCD.

In the aforementioned manner, the patterned light having entered to the light receiving surface of the two-dimensional image sensor CCD is converted into electric signal by the image-signal conversion function of the two-dimensional image sensor CCD, whereby the two-dimensional pattern information corresponding to the information recorded in the recording medium M is reproduced.

Figure 3:
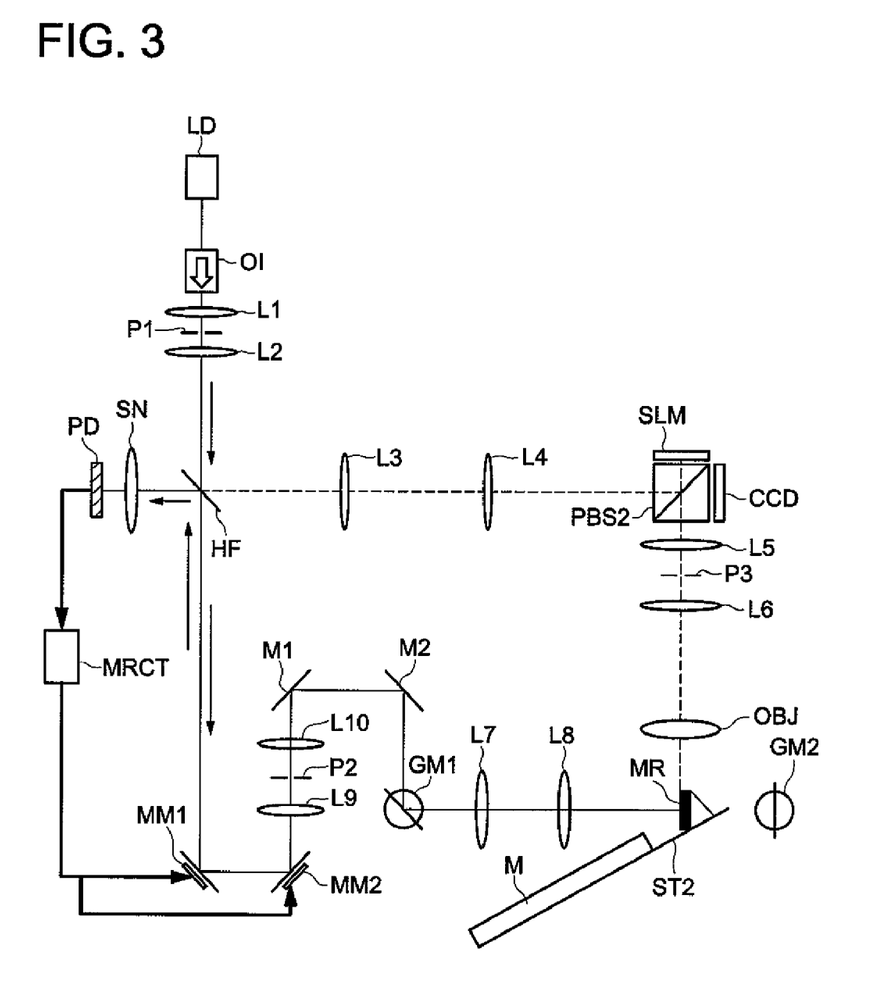
FIG. 3 is a block diagram of an optical information recording and reproducing apparatus including a correction mechanism as a first embodiment.
Figure 4:
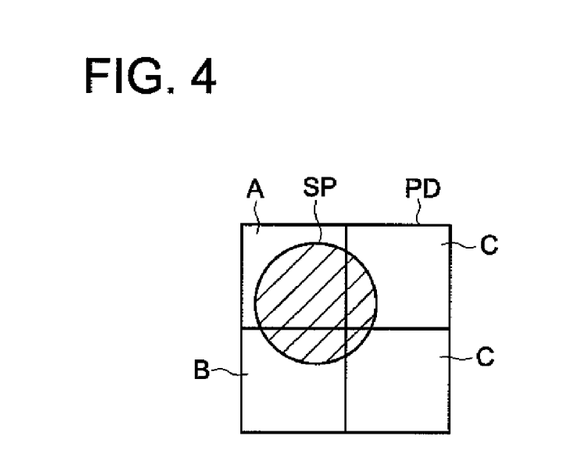
FIG. 4 is a diagram schematically showing a light receiving surface of detector PD.

FIG. 3 is a block diagram of the optical information recording and reproducing apparatus provided with elements such as a moving device, a mirror, a detector and a correction mechanism as a first embodiment. Differently from FIGS. 1 and 2, any component other than the movable mirror control system is omitted in FIG. 3. FIG. 4 is a diagram schematically showing the light receiving surface of detector PD.

In the present embodiment shown in FIG. 3, half mirror HM is provided instead of the first polarized beam splitter PBS1, in contrast to the aforementioned comparative example. Further, sensor lens SN and detector PD are provided in the vicinity of the half mirror HM. Further, first movable mirror MM1, second movable mirror MM2, ninth lens L9, second pin hole P2, tenth lens L10, first mirror M1 and second mirror M2 are arranged in that order between the half mirror HM and second galvano mirror GM2. The first movable mirror MM1 and second movable mirror MM2 constituting the correction mechanism are designed in such a way that the mirror surfaces can be three-dimensionally displaced through a drive mechanism with respect to the frame with other optical elements fixed thereon. The first movable mirror MM1 and second movable mirror MM2 are driven and controlled by the mirror controller MRCT in response to the signal from the detector PD.

Figure 5:
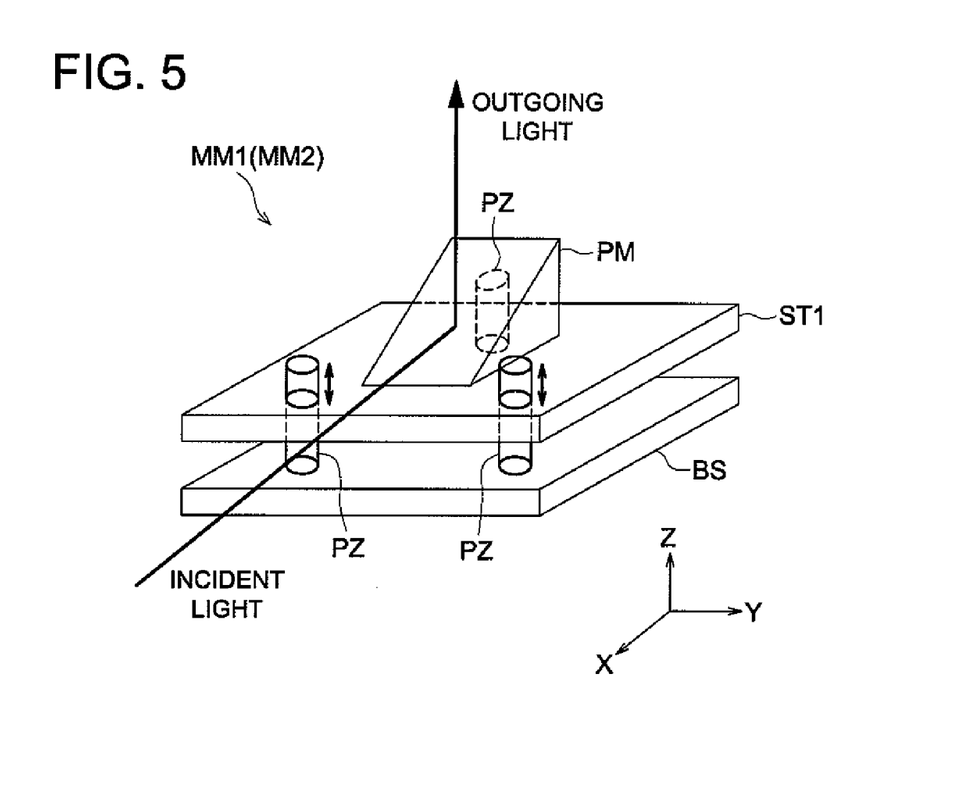
FIG. 5 is a perspective view showing first movable mirror MM1.

FIG. 5 is a perspective view showing the first movable mirror MM1. It should be noted that the second movable mirror MM2 is also designed in the same configuration. In FIG. 5, the first movable mirror MM1 includes tabular base BS fixed onto the frame, tabular stage ST1 arranged in parallel in the form detached from the base BS, prism mirror PM placed on the stage ST1, and three piezoelectric elements PZ for connecting the base BS with the stage ST1. The inclined surface of the prism mirror PM serves as the mirror surface (mirror) that reflects light. Three piezoelectric elements PZ are arranged so as to be positioned at the respective apexes of a virtual triangle on the base BS and stage ST1, and are capable of expansion and contraction using the electric power supplied from an unillustrated drive device individually. In this case, if the amounts of expansion and contraction of three piezoelectric elements PZ are set to predetermined values, an angle of stage ST1 can be set by tilting the stage ST1 as desired in the directions X and Y with respect to the base BS along the XY plane of FIG. 5. This allows the inclination of the mirror surface of the prism mirror PM to be adjusted three-dimensionally. The base BS, stage ST1, and piezoelectric elements PZ constitute a drive mechanism.

Figure 6A:
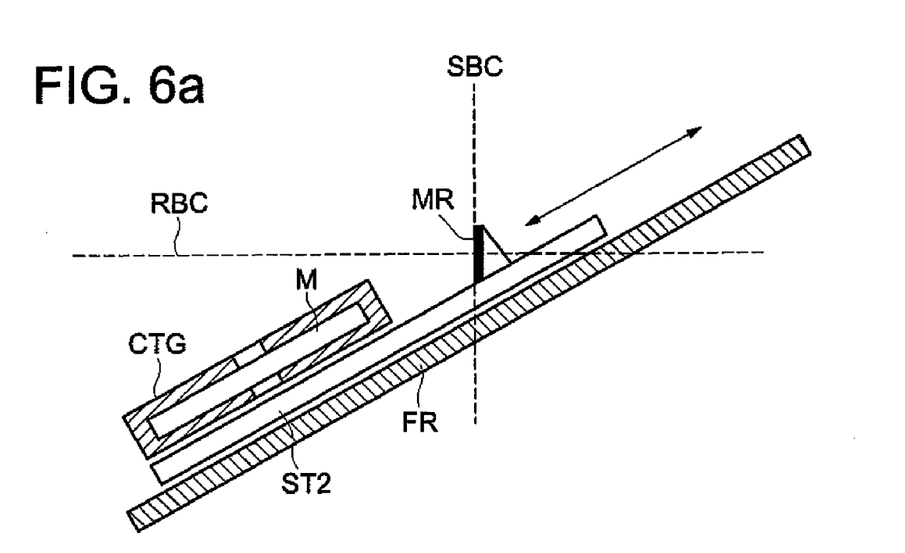
FIGS. 6a and 6b are schematic configuration diagrams representing the periphery of recording medium M held by stage ST2.
Figure 6B:
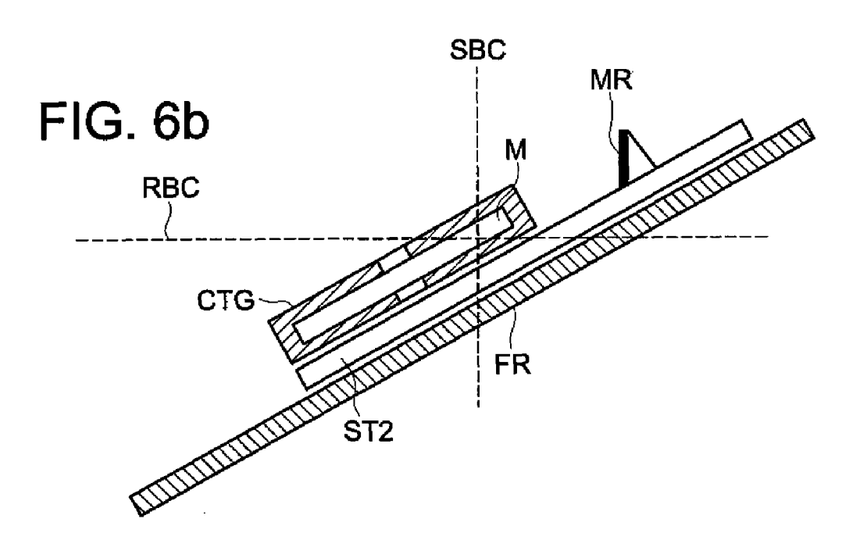

FIGS. 6a and 6b are schematic configuration diagrams representing the periphery of recording medium M. In FIGS. 6a and 6b, the tracking stage ST2 served as a moving device is held movably in the direction of arrow by an unillustrated actuator with respect to the frame FR. On the stage ST2, recording medium M is put at a predetermined position with cartridge CTG housing the recording medium therein. Mirror MR is fixed on the upper side of the end of the stage ST2. When the recording medium M together with the stage S has moved to the recording and reproduction position shown in FIG. 6b, the mirror MR moves to the position displaced from the reference beam (wherein the center of light flux is denoted by RBC in FIGS. 6a and 6b). When the recording medium M has moved to the retracted position shown in FIGS. 3 and 6a, the mirror moves to the position where the mirror can reflect the reference beam. More preferably, when the recording medium M has moved to the retracted position, the mirror M moves to such a position that the information beam (wherein the center of light flux is denoted by SBC in FIGS. 6a and 6b) and the reference beam in the recording mode intersect to each other at a reflection point on the mirror M.

The following describes the method for detecting and adjusting the deviation of a light flux in the optical information recording and reproducing apparatus as the first embodiment. In this structure, adjustment is made with reference to an optical axis determined by the pin hole P2 and mirror MR. In this case, when a deviation of the reference beam is detected and adjusted, the recording medium M is retracted to the retracted position (see FIG. 6a) by moving the stage ST2 served as a moving device of the recording medium M. When light is emitted from the semiconductor laser LD under this condition, after passing through the half mirror HM, the light passes through the first movable mirror MM1, the second movable mirror MM2, the ninth lens L9 and the second pin hole P2, the tenth lens L10, the first mirror M1, the second mirror M2, the first galvano mirror GM1, seventh lens L7 and the eighth lens L8, as shown in FIG. 3. After being reflected by the mirror MR on the stage ST2, the light travels along the same optical path to go back to the original position. Then the light is reflected by the half mirror HM and is converged on the light receiving surface of the detector PD by the sensor lens SN. The mirror controller MRCT with the signal from the detector PD having been input therein detects a deviation of the reference beam according to the following procedure, and drives and controls the movable mirrors MM1 and MM2.

For example, a two-dimensional image sensor such as a CCD divided in four adjacent parts each having the same size can be used as detector PD. In this case, when spot SP of the reference beam has been formed on the light receiving surface, the signals in response to the amount of light received on each of areas A through D as the result of division into four parts are assumed as SA through SD. Based on this assumption, the following calculation is made:

$$X=(SA+SC)-(SB+SD)$$

$$Y=(SA+SB)-(SC+SD)$$

This indicates that, as the absolute values of X and Y are greater, a greater deviation occurs in the position of the converged spot SP. To ensure that the center of the spot SP agrees with the center of the light receiving surface, the angle of the first movable mirror MM1 or the second movable mirror MM2 is displaced so as to come closer to X=0 and Y=0 as far as practicable. Then deviation can be adjusted in this manner.

After the deviation has been detected, the stage ST2 is moved as shown in FIG. 6b, whereby the mirror MR is moved to the position wherein reference beam is not reflected. In the meantime, the recording medium M is moved to the recording and reproduction position, whereby information can be recorded and reproduced.

Figure 7A:
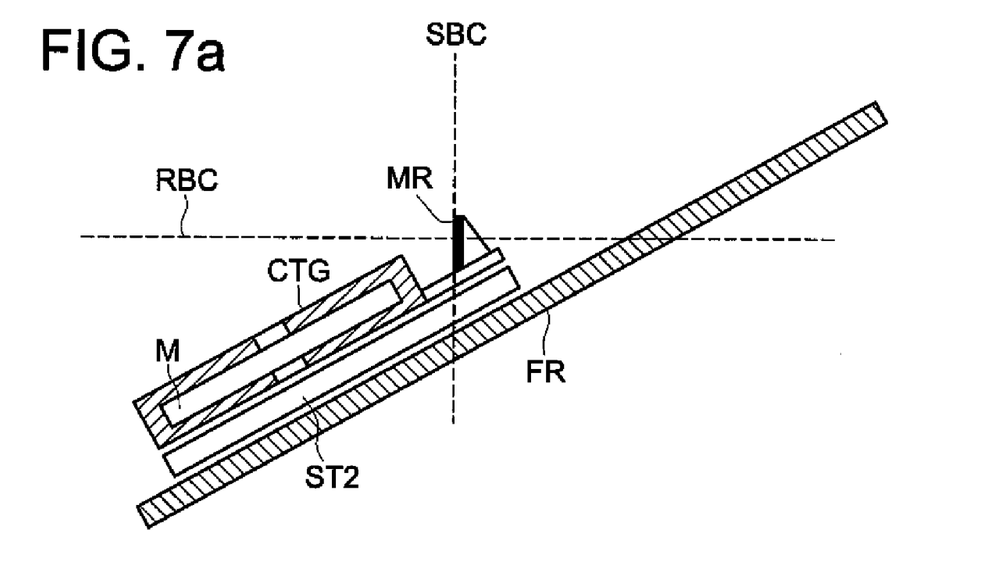
FIGS. 7a and 7b are schematic configuration diagrams representing the periphery of recording medium M held by stage ST2 as a variation example.
Figure 7B:
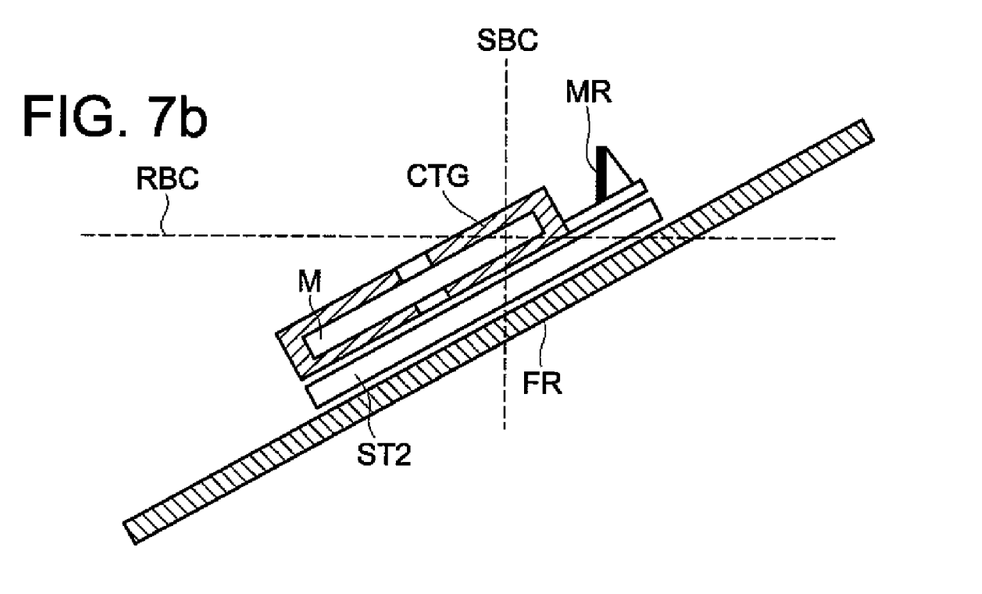
Figure 8:
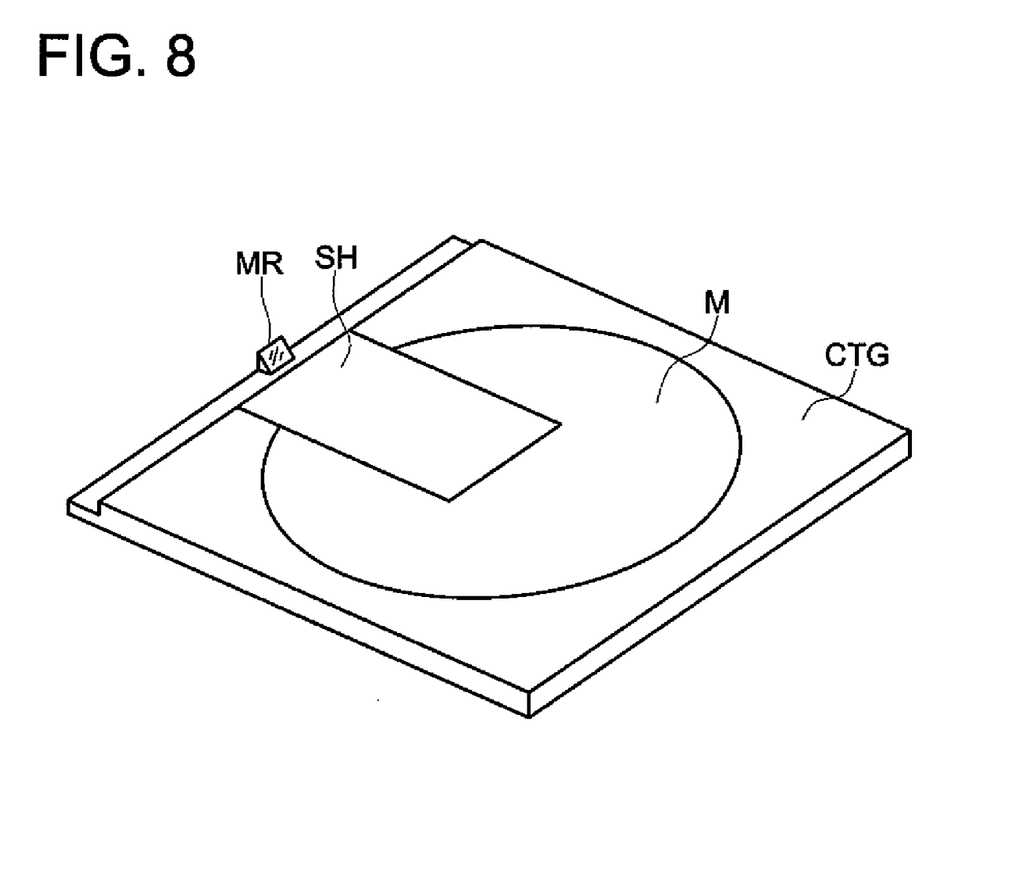
FIG. 8 is a perspective view representing a recording medium as a variation example.

FIGS. 7a and 7b are similar to the diagrams of FIGS. 6a and 6b, but represent a variation of the present embodiment. FIG. 8 is a perspective view representing a recording medium as a variation. In this variation, mirror MR is formed, instead of the stage ST2, on the casing of the cartridge CTG for the recording medium M. To put it more specifically, one end of the casing of the cartridge CTG is extended in a tabular form, as shown in FIG. 8. There is arranged shutter SH on the casing of the cartridge CTG to cover an opening that exposes the recording medium M. The mirror MR is arranged in the vicinity of the shutter SH on the extended casing of the cartridge CTG.

When the recording medium M together with the stage ST2 has moved to the recording and reproduction position shown in FIG. 7b, the mirror MR provided on the casing of the cartridge CTG moves to the position displaced from the reference beam (wherein the center of light flux is represented by RBC in FIGS. 7a and 7b). This permits the operation of recording and reproduction using the recording medium M. In the meantime, when the recording medium M has moved to the retracted position shown in FIG. 7a, the mirror MR moves to a position that the mirror can reflect the reference beam. This allows the deviation to be detected, according to the aforementioned procedure.

More preferably, when the recording medium M has moved to the retracted position, the mirror M moves to such a position that the information beam (wherein the center of light flux is denoted by SBC in FIGS. 7a and 7b) and the reference beam in the recording mode intersect to each other at the reflection point.

The cartridge CTG can be provided as a part consisting the optical information recording and reproducing apparatus. Alternatively, the cartridge can be independently provided as a cartridge for housing a recording medium and for being carried on the optical information recording and reproducing apparatus.

Figure 9:
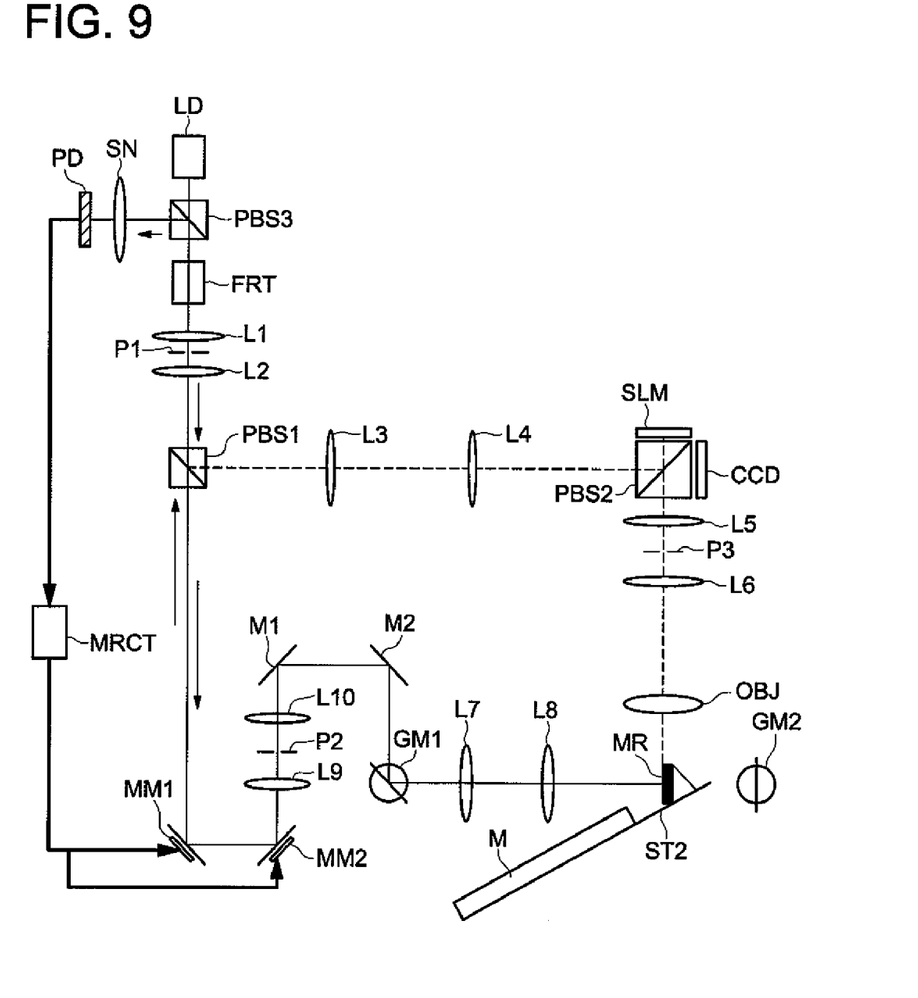
FIG. 9 is a block diagram showing an optical information recording and reproducing apparatus including a correction mechanism, as a second embodiment.

FIG. 9 is a block diagram showing the optical information recording and reproducing apparatus provided with elements such as a moving device, a mirror, a detector, and a correction mechanism, as a second embodiment. Differently from FIGS. 1 and 2, any component other than the movable mirror control system is omitted in this diagram. This structure is intended to make adjustment with reference to an optical axis defined by the pin hole P2 and mirror MR. In the present embodiment, third polarized beam splitter PBS3 and Faraday rotator FRT are arranged instead of the optical isolator OI, with respect to the embodiment shown in FIG. 3. Further, first polarized beam splitter PBS1 is used instead of the half mirror HM. Otherwise, the structure is the same as that of the embodiment shown in FIG. 3.

When deviation of the reference beam is detected and adjusted, the recording medium M is retracted to the retracted position (see FIG. 9) by moving stage ST2 served as a moving device. If light is emitted from the semiconductor laser LD under this condition, the light travels along the optical path of FIG. 9. After having been reflected by the mirror MR on the stage ST2, the light travels along the same optical path to go back to the original position. After having been reflected by the third polarized beam splitter PBS3, the light enters the light receiving surface of the detector PD through the sensor lens SN. The mirror controller MRCT wherein signal from the detector PD has been inputted detects the deviation of the reference beam according to the aforementioned procedure, whereby the movable mirrors MM1 and MM2 can be driven and controlled. In this case, the polarized beam splitter PBS3 arranged in the vicinity of the semiconductor laser LD is used to capture the signal to the detector PD from the optical path. As shown in FIG. 9, the functions of the optical isolator OI can be achieved by arranging the polarized beam splitter PBS3 and Faraday rotator FRT. These elements can exhibit both of the adjusting-light capturing function and the functions of the optical isolator OI. Thus, this arrangement realizes cost saving.

Figure 10:
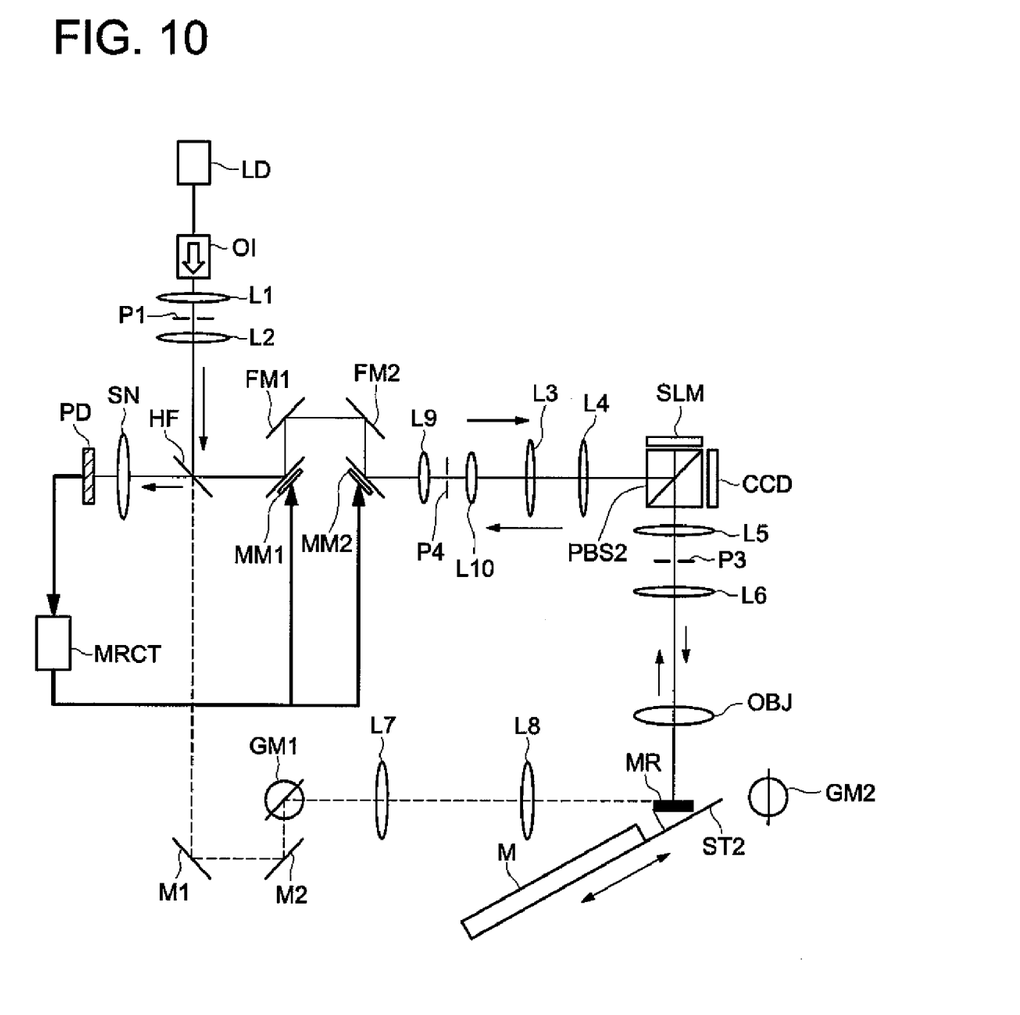
FIG. 10 is a block diagram showing an optical information recording and reproducing apparatus including a correction mechanism, as a third embodiment.

FIG. 10 is a block diagram showing the optical information recording and reproducing apparatus provided with elements such as a moving device, a mirror, detector, and a correction mechanism, as a third embodiment. Differently from FIGS. 1 and 2, any component other than the movable mirror control system is omitted in FIG. 10. This structure is intended to make adjustment with reference to an optical axis defined by any two of the pin holes P3 and P4, and mirror MR. The present embodiment ensures a deviation of the information beam to be detected. As compared with the embodiment of FIG. 3, the correction mechanism including the first movable mirror MM1, the first fixed mirror FM1, the second fixed mirror FM2 and the second movable mirror MM2, the ninth lens L9, fourth pin hole P4 and tenth lens L10 are arranged in that order between the half mirror HM and third lens L3.

The mirror MR is fixed on the upper surface of the end of the stage ST2 in such a way that the reflecting surface is faced perpendicular to the optical axis of the objective lens OBJ. This mirror MR goes to the position displaced from the information beam, when the recording medium M has moved to the recording and reproduction position together with the stage ST2. When the recording medium M has moved to the retracted position (see FIG. 10), the mirror MR moves to the position wherein the mirror can reflect the information beam. More preferably, when the recording medium M has moved to the retracted position, the mirror M moves to such a position that the information beam and the reference beam in the recording mode intersect to other at the reflection point on the mirror.

The following describes the detection and adjustment of light flux deviation in the optical information recording and reproducing apparatus as a third embodiment. In this case, to detect and adjust the light flux deviation, the recording medium M is retracted to the retracted position by moving stage ST2 served as a moving device. When light is emitted from the semiconductor laser LD under this condition, after having been reflected by the half mirror HM, the light is reflected by the first movable mirror MM1, the first fixed mirror FM1, the second fixed mirror FM2 and the second movable mirror MM2, as shown in FIG. 10. Further, the light passes through the ninth lens L9, second pin hole P2, tenth lens L10, third lens L3 and fourth lens L4. Having being reflected by the second polarized beam splitter PBS2, the light is reflected by the spatial light modulator SLM and is outputted from the second polarized beam splitter PBS2. The light then passes through the fifth lens L5, third pin hole P3 and sixth lens L6, and is reflected by the mirror MR on the stage ST2 through the objective lens OBJ. This reflected light enters again to the objective lens OBJ. The light travels along the same optical path to go back to the original position. After having passed through the half mirror HM, the light enters the light receiving surface of the detector PD through the sensor lens SN. The mirror controller MRCT wherein signal from the detector PD has been inputted detects the deviation of the reference beam according to the aforementioned procedure, whereby the movable mirrors MM1 and MM2 can be driven and controlled.

Figure 11A:
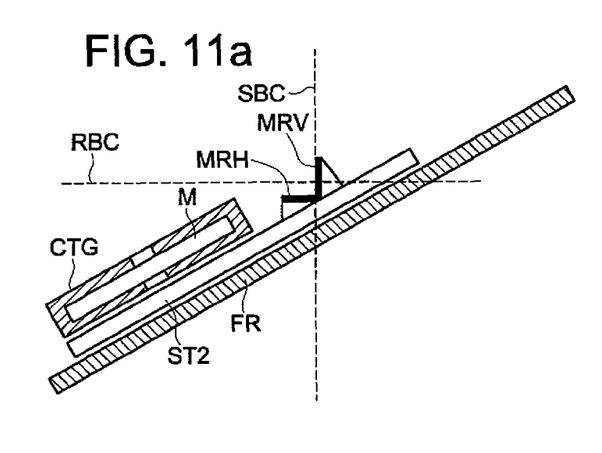
FIGS. 11a, 11b and 11c are the diagrams similar to FIGS. 6a, 6b, 7a and 7b, as another variation examples.
Figure 11B:
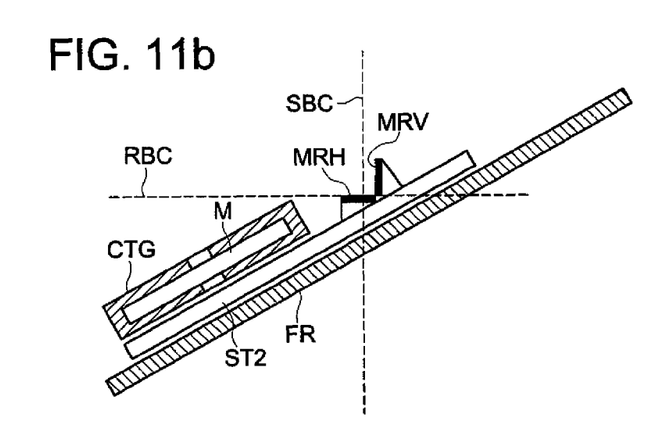
Figure 11C:
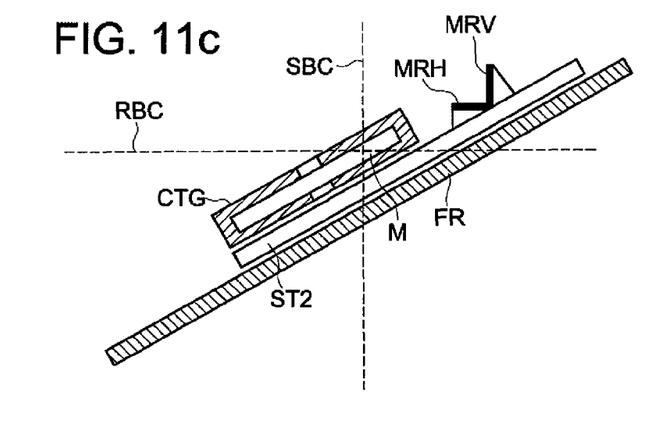

FIGS. 11a, 11b and 11c are similar diagrams to FIGS. 6a, 6b, 7a and 7b, but represent another variation. The same structures will not be described to avoid duplication. This variation is capable of handling deviations of both the reference beam and information beam. To put it more specifically, two mirrors MRV and MRH containing reflecting surfaces are fixed on the upper surface of the end of the stage ST2 in the directions crossing each other. When the stage ST2 put the recording medium M thereon has moved to the recording and reproduction position shown in FIG. 11c, the mirrors MRV and MRH move to the position displaced from the reference beam (the center of light flux is indicated by RBC in FIGS. 11a through 11c) and information beam (the center of light flux is indicated by SBC in FIG. 11a through 11c).

On the other hand, when the stage ST2 put the recording medium M thereon has moved to the first retracted position shown in FIG. 11a, the mirror MRV moves to a position where the mirror MRV can reflect the reference beam. Further, when the stage ST2 has moved to the second retracted position shown in FIG. 11b, mirror MRH moves to a position where the mirror MRH can reflect the information beam. At this time, mirrors MRH and MRV are preferably moved to a position such that the information beam and the reference beam in the information recording mode intersect to each other on the reflection point on the mirrors MRH and MRV. As will be apparent from the above description, when deviation is to be detected for reference beam, it is only required that the stage ST2 should be moved to the first retracted position shown in FIG. 11a. When deviation is to be detected for information beam, it is only required that the stage ST2 should be moved to the second retracted position shown in FIG. 11b. This structure, although simple, ensures deviation to be detected for either of the reference beam and information beam.

Figure 12:
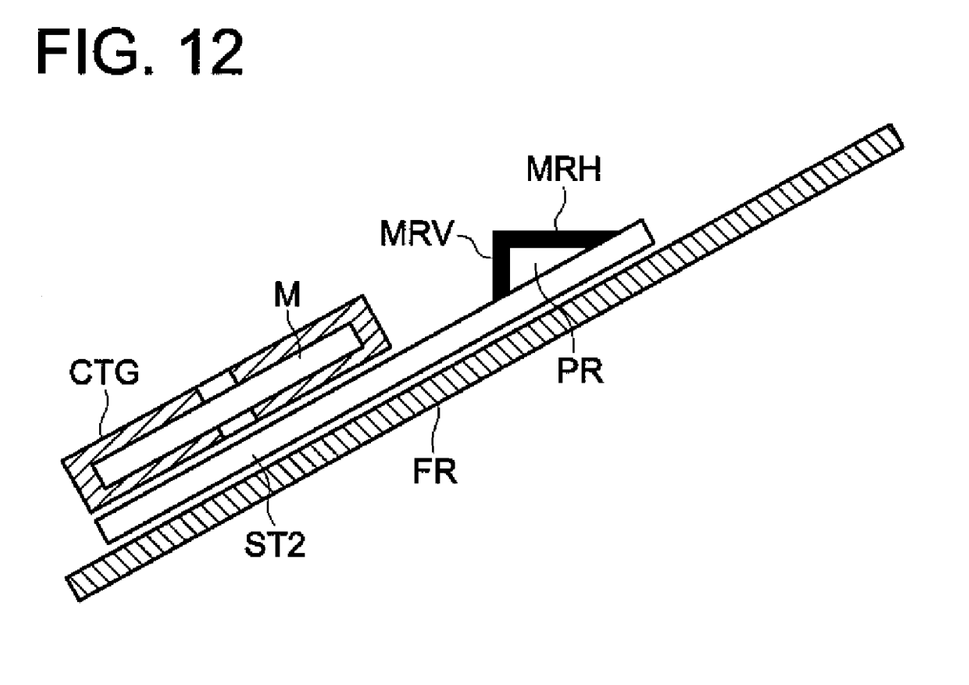
FIG. 12 is the diagram similar to FIGS. 6a, 6b, 7a and 7b, representing still another variation example.

FIG. 12 is a diagram similar to FIGS. 6a, 6b, 7a and 7b, but represents still another variation. In this variation, prism PR2 is mounted on the stage ST2. In the prism PR, mirrors MRV and MRH are produced by forming reflecting films on two sides. Use of the prism PR permits a high-precision mirror to be produced at comparatively reduced costs.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

For example, the first to third embodiments show optical information recording and reproducing apparatuses each including a moving device, mirror, detector, and correction mechanism. However, the optical information recording and reproducing apparatuses as another embodiment of invention can include a moving device, mirror, and detector expect for the correction mechanism. They provide arrangements that a deviation of at least one of the information beam and reference beam can be detected with a simple structure with a reduced cost and can sufficiently exhibit the effect of the present invention.

The invention claimed is:

1. An optical information recording and reproducing apparatus comprising:
a light source;
a splitting element for splitting a light flux from the light source into light fluxes;
an optical system for guiding one of the light fluxes split by the splitting element to an information recording medium as a reference beam;
a spatial light modulation element for receiving the other of light fluxes split by the splitting element and generating an information beam;
an objective lens for converging the information beam onto the information recording medium;
an image receiving element for receiving a light flux from the information recording medium;
a moving device for moving the information recording medium between a recording and reproducing position where information can be recorded or reproduced for the information recording medium and a retracting position where the information recording medium is retracted away from the recording and reproducing position;
a mirror for moving together with the information recording medium; and
a detector for detecting a deviation of at least one of the reference beam and the information beam,
wherein the optical information recording and reproducing apparatus employs a two-beam interference method that information is recorded for the information recording medium by using an interference between the reference beam and the information beam both radiated from different directions, and
information is reproduced by radiating the reference beam onto the information recording medium and guiding the light flux from the information recording medium to the image receiving element, and
wherein the mirror moves to a position which is displaced from the at least one of the reference beam and the information beam when the information recording medium moves to the recording and reproducing position, and moves to a position where the mirror can reflect the at least one of the reference beam and the information beam toward the detector when the information recording medium moves to the retracting position.

2. The optical information recording and reproducing apparatus of claim 1,
wherein the mirror moves to a position such that the information beam and the reference beam intersect to each other at a reflection point on the mirror, when the information recording medium moves to the retracting position.

3. The optical information recording and reproducing apparatus of claim 1,
wherein the moving device is a stage for placing the information recording medium thereon and moving the information recording medium, and
the mirror is mounted on the stage.

4. The optical information recording and reproducing apparatus of claim 1, further comprising
a cartridge for being moved by the moving device and for housing the information recording medium therein, and
the mirror is mounted on the cartridge.

5. The optical information recording and reproducing apparatus of claim 1, further comprising:
a lens for converging a light flux onto a light-receiving surface of the detector, the light flux traveling along an optical path of the at least one of the reference beam and the information beam after being reflected by the mirror.

6. The optical information recording and reproducing apparatus of claim 1, further comprising:
a correction mechanism for correcting the deviation of the at least one of the information beam and the reference beam based on an output of the detector, comprising two mirrors arranged at an optical path between the light source and the information recording medium, and a drive mechanism for changing an angle between the two mirrors.

* * * * *